US012725265B2

(12) United States Patent
Datar et al.

(10) Patent No.: US 12,725,265 B2
(45) Date of Patent: Sep. 1, 2026

(54) SYSTEM AND METHOD FOR DIFFERENTIATING A TISSUE OF INTEREST FROM ANOTHER PART OF A MEDICAL SCANNER IMAGE

(71) Applicant: Siemens Healthcare GmbH, Erlangen (DE)

(72) Inventors: Manasi Datar, Erfurt (DE); Martin Kraus, Fuerth (DE); Jan Kretschmer, Nuremberg (DE); Ramyar Biniazan, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 631 days.

(21) Appl. No.: 17/942,598

(22) Filed: Sep. 12, 2022

(65) Prior Publication Data

US 2023/0079774 A1 Mar. 16, 2023

(30) Foreign Application Priority Data

Sep. 15, 2021 (EP) .................................... 21196952

(51) Int. Cl.
*G06T 7/12* (2017.01)
*G06T 7/11* (2017.01)
(Continued)

(52) U.S. Cl.
CPC ................. *G06T 7/12* (2017.01); *G06T 7/11* (2017.01); *G06T 7/13* (2017.01); *G06T 7/168* (2017.01);
(Continued)

(58) Field of Classification Search
CPC ..... G06T 7/10–194; G06T 2207/20081; G06T 2207/20084; G06T 2207/30068;
(Continued)

(56) References Cited

U.S. PATENT DOCUMENTS 6,035,056 A * 3/2000 Karssemeijer ......... G06V 10/48 382/281
2011/0123075 A1 5/2011 Nie et al.
(Continued)

FOREIGN PATENT DOCUMENTS

CN 112001925 A 11/2020
CN 112132808 A 12/2020

OTHER PUBLICATIONS

Rampun A., et al.,"Breast pectoral muscle segmentation in mammograms using a modified holistically-nested edge-detection network", Medical Image Analysis, 57, 1-17, 2019. (Year: 2019).*
(Continued)

*Primary Examiner* — Geoffrey E Summers
(74) *Attorney, Agent, or Firm* — HARNESS, DICKEY & PIERCE, P.L.C.

(57) ABSTRACT

One or more example embodiments provides a system and a method for differentiating a tissue of interest from another part of a medical scanner image, in particular pectoral muscle tissue from breast tissue in an X-ray mammography image. The method comprises providing a medical scanner image; inputting input data into a trained artificial neural network, the input data being based on the provided medical scanner image; generating, by the trained artificial neural network, output data based on the input data, the output data indicating a one-dimensional borderline between at least a part of the tissue of interest and the at least one other part of the medical scanner image; and outputting an output signal comprising or based on the generated output data.

6 Claims, 3 Drawing Sheets

(51) Int. Cl.
*G06T 7/13* (2017.01)
*G06T 7/168* (2017.01)
*G06V 10/26* (2022.01)

(52) U.S. Cl.
CPC .. *G06V 10/273* (2022.01); *G06T 2207/10116* (2013.01); *G06T 2207/20036* (2013.01); *G06T 2207/20056* (2013.01); *G06T 2207/20084* (2013.01); *G06T 2207/30068* (2013.01)

(58) Field of Classification Search
CPC . G06T 2207/10116; G06T 2207/20056; G06T 2207/20036; G06N 3/02–0985; G06V 10/273
See application file for complete search history.

(56) References Cited

U.S. PATENT DOCUMENTS

2013/0223711 A1 8/2013 Knapp et al.
2020/0167928 A1* 5/2020 Heindl .................. A61B 5/055
2021/0158513 A1* 5/2021 Kato .................... A61B 6/5217

OTHER PUBLICATIONS

Riaz et al.: "FourierNet: Compact Mask Representation for Instance Segmentation Using Differentiable Shape Decoders"; 25th International Conference on Pattern Recognition (ICPR) 2020; Jan. 10, 2021 (Year: 2021).*

Ali, Muhammad Junaid, et al. "Enhancing breast pectoral muscle segmentation performance by using skip connections in fully convolutional network." International Journal of Imaging Systems and Technology 30.4 (2020): 1108-1118. (Year: 2020).*

Chellappa, Rama, and R. Bagdazian. "Fourier coding of image boundaries." IEEE Transactions on Pattern Analysis and Machine Intelligence 1 (1984): 102-105. (Year: 1984).*

Liu, Wei, Chengqian Liu, and Yiran Wei. "Utilizing deep learning technology to segment pectoral muscle in mediolateral oblique view mammograms." 2020 IEEE 5th International Conference on Signal and Image Processing (ICSIP). IEEE, 2020. (Year: 2020).*

Ma, Xiangyuan, et al. "Fully automated pectoral muscle identification on MLO-view mammograms with deep convolutional neural network." 14th International Workshop on Breast Imaging (IWBI 2018). vol. 10718. SPIE, 2018. (Year: 2018).*

Moghbel, Mehrdad, et al. "A review of breast boundary and pectoral muscle segmentation methods in computer-aided detection/diagnosis of breast mammography." Artificial Intelligence Review 53 (2020): 1873-1918. (Year: 2019).*

Nie, Ke, et al. "Development of a quantitative method for analysis of breast density based on three-dimensional breast MRI." Medical physics 35.12 (2008): 5253-5262. (Year: 2008).*

Soleimani, Hossein, and Oleg V. Michailovich. "On segmentation of pectoral muscle in digital mammograms by means of deep learning." IEEE Access 8 (2020): 204173-204182. (Year: 2020).*

Xu, Wenqiang, et al. "Explicit Shape Encoding for Real-Time Instance Segmentation." 2019 IEEE/CVF International Conference on Computer Vision (ICCV). IEEE, 2019. (Year: 2019).*

Sonka, Milan et al. Image Processing, Analysis and Machine Vision. Springer, 1993. pp. 192-254. (Year: 1993).*

Gonzalez, Rafael C. and Richard E. Woods. Digital Image Processing. 3rd ed., Prentice Hall, 2008, pp. 627-635. (Year: 2008).*

Gonzalez, Rafael C. and Richard E. Woods, Digital Image Processing, 3rd ed., Prentice Hall, 2008, pp. 65-68. (Year: 2008).*

Ghosh, Swarnendu, Nibaran Das, and Mita Nasipuri. "Reshaping inputs for convolutional neural network: Some common and uncommon methods." Pattern Recognition 93 (2019): 79-94. (Year: 2019).*

Riaz et al.: "FourierNet: Compact Mask Representation for Instance Segmentation Using Differentiable Shape Decoders"; 25th International Conference on Pattern Recognition (ICPR) 2020; Jan. 10, 2021.

Zafari, Sahar et al: "Automated Segmentation of the Pectoral Muscle in Axial Breast MR Images"; Oct. 21, 2019; Computer Vision—ECCV 2020: 16th European Conference; Glasgow, UK; Aug. 23-28, 2020; Proceedings; [Lecture Notes in Computer Science; ISSN 0302-9743]; Springer International Publishing; Cham; pp. 345-356; XP047545413; ISBN: 978-3-030-58594-5; 2019.

Rampun A., et al.,"Breast pectoral muscle segmentation in mammograms using a modified holistically-nested edge-detection network", Medical Image Analysis, 57, 1-17, 2019.

Zebari et al.: "Improved Threshold Based and Trainable Fully Automated Segmentation for Breast Cancer Boundary and Pectoral Muscle in Mammogram Images"; IEEE Acess, IEEE, USA, vol. 8; Nov. 4, 2020.

Huang G. et al:"Densely Connected Convolutional Networks" Proceedings of the IEEE. Conference on Computer Vision and Pattern Recognition CVPR) pp. 4700-4708, 2017.

Ronneberger et al.: "U-Net: Convolutional Networks for Biomedical Image Segmentation"; Medical Image Computing and Computer-Assisted Intervention—MICCAI 2015 : 18th International Conference, Munich, Germany, Oct. 5-9, 2015; Oct. 9, 2015.

Yang Yang et al; "Machine Vision Processing Technology Based on MATLAB"; Southeast University Press; pp. 171; Mar. 2022.

* cited by examiner 5
7
4
3
1
2

150 100
110 120 130 140 200
1 71

SYSTEM AND METHOD FOR DIFFERENTIATING A TISSUE OF INTEREST FROM ANOTHER PART OF A MEDICAL SCANNER IMAGE

CROSS-REFERENCE TO RELATED APPLICATION(S)

The present application claims priority under 35 U.S.C. § 119 to European Patent Application No. 21196952.2, filed Sep. 15, 2021, the entire contents of which are incorporated herein by reference.

FIELD

One or more example embodiments of the present invention relates to a system and a method for differentiating a tissue of interest from another part of a medical scanner image. In particular, the medical scanner image may be an X-ray image, more particularly an X-ray mammography image. The tissue of interest may be a pectoral muscle within the medical scanner image, particularly within the X-ray mammography image, wherein the other part may be breast tissue. One or more example embodiments of the present invention also relates to a method for training an artificial neural network for use in the above system or method.

BACKGROUND

Medical scanner images play an increasingly large role for all kinds of diagnoses. Often, medical scanner images are provided to automated diagnosis systems or automated diagnosis assistant systems, which in turn are often based on artificial intelligence entities such as artificial neural networks. In order for a desired diagnosis to be as accurate as possible, it is preferred that only tissue (preferably organic cells) which are important to the diagnosis are visible in the medical scanner image to be analyzed.

If this is achieved, then for example artificial neural networks can be very precisely trained to distinguish tissue portions or cells from each other based on sometimes minute or even humanly imperceptible differences. However, when in the medical scanner image there is a completely different type of cell or tissue portion present, the diagnosis may be hampered or even rendered impossible. For similar reasons, it is preferred that also medical scanner images used for training such artificial neural networks contain preferably only the relevant tissue necessary for the diagnosis if it can be ensured that also in the inference phase, that is, when the artificial intelligence entity encounters previously unknown medical scanner images and analyzes them, can be provided in the same way.

As an example, X-ray mammography is a widely used and reliable method for detecting pre-symptomatic breast cancer. Accurate segmentation of the pectoral muscle is important for mammography image analysis as the pectoral muscle and the breast tissue may have similar image intensity, texture and appearance characteristics in the mammogram. The inclusion of the pectoral muscle in quantification algorithms (e.g. breast density estimation) may lead to inaccurate characterization of the breast tissue. Registration of mammograms (pairwise or longitudinal) also benefits from the pectoral muscle boundary as an important landmark. From a clinical point of view, the pectoral muscle position and orientation plays an important role in obtaining a good quality mediolateral (MLO) mammogram.

Pectoral muscle segmentation in mammography images remains challenging due to the significant variability in the shape and appearance of the pectoral muscle. The pectoral muscle boundary may be a straight line, a convex or concave curve, or a free-form curve that is difficult to approximate analytically. Furthermore, the pectoral muscle may be obscured or invisible due to occlusion artefacts or the presence of dense breast tissue with similar appearance. The presence of the axillary fold and overlapping fibro-glandular tissue present additional challenges for pectoral muscle segmentation.

Previously known pectoral muscle segmentation methods broadly fall into in one of two categories: On the one hand, there are Geometry-based methods, which rely on hand-crafted models of the pectoral muscle boundary as a straight line or a parametric curve or a combination of both. On the second hand, there are deep learning methods such as convolutional neural networks, CNN, which learn to predict the pectoral muscle region from a large training set of mammograms with the pectoral muscle region being labeled.

Geometry-based methods are limited by their curve parametrization and are incapable of modelling the complex shape variations of the pectoral muscle boundary in all its variations. Deep learning methods are limited by the variability present in the training data set and may lead to inaccurate results and unreliable performance on unseen mammograms in the inference phase. Both these types of pectoral muscle segmentation methods also suffer from limitations when the pectoral muscle boundary is obscured by the presence of overlapping breast tissue.

Moreover, classic deep learning methods including convolutional neural networks often comprise a large number of parameters because the original images are pixel images with, for example, 1024×1024 pixels (or: features), each pixel having a grey scale value from, for example between 0 and 255. Accordingly, a large number of input nodes, hidden layers and output nodes is necessary for producing a pectoral muscle segmentation mask in the commonly known way by a pixel-to-pixel, image-to-image method. A large number of pixels also leads to a very resource-intensive and slow training of the artificial neural network.

The use of convolutional networks with specific architecture for biomedical image segmentation is known for example from the scientific publication of Ronneberger et al., "U-Net: Convolutional networks for biomedical image segmentation", Medical Image Computing and Computer-Assisted Intervention (MICCAI), Springer, LMCS, Vol. 9351:234-241, 2015, which will in the following be cited as "Ronneberger et al.". In short, the U-net is a network comprising convolutional layers wherein a first section of the U-net is an encoder branch followed by a usually (essentially) equally sized decoder branch. Similar in principle to an autoencoder, from biomedical images first, in the encoder branch, highly relevant information-rich hidden layers are generated which are then, in the decoder branch, decoded again in order to generate segmented medical images.

The U-net receives its name by one or more shortcut connections between parts of the encoder branch and the decoder branch in which hidden features are transferred from the encoder branch to the decoder branch. This means that in the decoder branch not only the highly encoded end product of the encoder branch is used, but also comparatively lightly encoded previous hidden features of the encoder branch which may retain more of the original structural information about the input image. The shortcut connections are usually drawn as straight lines such that the encoder branch and the decoder branch are depicted as the two essentially symmetric sides of a “U-shape” with the shortcut connections arranged in between. Convolutional neural networks of the U-net type have achieved considerable success in biomedical image segmentation.

Another type of artificial neural network successful in biomedical image segmentation is the so-called DenseNet proposed in the scientific publication of G. Huang et al., “Densely Connected Convolutional Networks”, Proceedings of the IEEE Conference on Computer Vision and Pattern Recognition (CVPR), pp. 4700-408, 2017, cited herein as “Huang et al.”.

The scientific publication by A. Rampun et al., “Breast pectoral muscle segmentation in mammograms using a modified holistically-nested edge detection network” describes the use of a convolutional neural network for detecting a borderline between pectoral muscle tissue and surrounding tissue for a 2-dimensional breast pectoral muscle segmentation in mammograms.

SUMMARY

One or more example embodiments of the present invention solves the above-described problems and provides systems and methods for differentiating tissue of interest from at least one other part of a medical scanner image, which is more accurate and uses fewer resources at the same time.

This objective is fulfilled by the subject matter of the independent claims.

According to one or more example embodiments, a system for differentiating a tissue of interest from at least one other part of a medical scanner image includes an input module configured to receive a medical scanner image; a computing device configured to implement a trained artificial neural network and configured to generate output data based on the medical scanner image, the output data indicating a one-dimensional borderline between at least a part of the tissue of interest and at least one other part within the medical scanner image; and an output module configured to output an output signal comprising or based on the output data.

According to one or more example embodiments, a computer-implemented method for differentiating a tissue of interest from at least one other part of a medical scanner image includes providing a medical scanner image; inputting input data into a trained artificial neural network, the input data being based on the provided medical scanner image; generating, by the trained artificial neural network, output data based on the input data, the output data indicating a one-dimensional borderline between at least a part of the tissue of interest and the at least one other part of the medical scanner image; and outputting an output signal comprising or based on the generated output data.

According to one or more example a embodiments, computer-implemented method for training an artificial neural network for differentiating a tissue of interest from at least one other part of a medical scanner image includes providing a set of medical scanner training images; providing, for each medical scanner training image, label data indicating a labeled one-dimensional borderline between at least a part of the tissue of interest and the at least one other part of the medical scanner training image; providing an artificial neural network configured to receive at least one of the medical scanner training images as input data and to generate output data based on the input data, the output data indicating a generated one-dimensional borderline between at least the part of the tissue of interest and the at least one other part of the medical scanner training image; and training the artificial neural network with supervised learning using a loss function penalizing differences between the output data and the label data.

BRIEF DESCRIPTION OF THE DRAWINGS

Example embodiments of the present invention will be explained in greater detail with reference to exemplary embodiments depicted in the drawings as appended.

The accompanying drawings are included to provide a further understanding of the present invention and are incorporated in, and constitute a part of, this specification. The drawings illustrate embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

In the figures:

FIG. 1 shows an exemplary medical scanner image with a borderline candidate according to the prior art;

FIG. 2 shows an exemplary medical scanner image with a borderline generated according to one ore more example embodiments of the present invention;

FIG. 3 shows a schematic block diagram illustrating a system according to an embodiment of the present invention;

FIG. 4 shows a schematic flow diagram illustrating a method according to an embodiment of the present invention;

FIG. 5 shows a schematic flow diagram illustrating a method according to an embodiment of the present invention;

FIG. 6 shows a schematic block diagram illustrating a computer program product according to an embodiment of the present invention; and FIG. 7 shows a schematic block diagram illustrating a data storage medium according to an embodiment of the present invention.

DETAILED DESCRIPTION

Figures 1, 2:
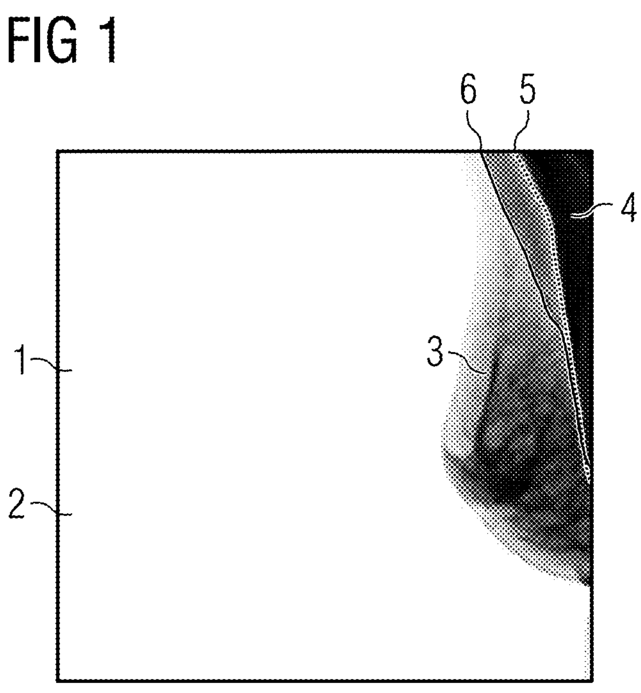

According to one or more example embodiments, a system for differentiating a tissue of interest from at least one other part of medical scanner image is provided, comprising:

- an input module configured to receive a medical scanner image, MSI;
- a computing device configured to implement an artificial neural network, ANN, trained and configured to generate, based on the medical scanner image, MSI, output data indicating a one-dimensional borderline between at least a part of the tissue of interest, TOI, and at least one other part of the medical scanner image, MSI; and
- an output module configured to output an output signal comprising or based on the output data.

The (at least one, or exactly one) other part of the medical scanner image may be, for instance, a particular type of other tissue, or the entire remainder of the medical scanner image. The remainder of the medical scanner image, MSI, may comprise, or consists of, tissue other than the tissue of interest, TOI, and/or a background (for example, areas where the imaging radiation has passed free space). Whenever a "tissue" is mentioned herein, it shall be understood that this should in particular refer to living organic tissue although other application may be possible, for example in the context of prostheses.

A medical scanner image in this context can be any type of image file that is produced, generated, or provided by a medical scanner (or: a medical scanner device). Such medical scanners may include X-ray machines, magnetic resonance imaging, MRI, scanners, computed tomography, CT, scanners, ultrasound images and/or the like. The medical scanner images may in particular be two-dimensional pixel images with one or more channels. In many medical scanner images, there is only a single grey scale channel such that each pixel corresponds to a feature wherein a numerical value of the feature, often ranging from 0 to 255, indicates a grey scale value of the corresponding pixel.

In other images, for example color images in the RGB scheme, there are three channels, each of which comprises a feature for each of the pixels of the color image; the R channel features indicate the intensity of the corresponding pixel with respect to red color, the G channel indicates the intensity of respective pixels with respect to the green color and the B channel indicates the intensity of the corresponding pixels with respect to the blue color.

In the language used herein, pixels and features are sometimes used interchangeably, in particular when the medical scanner image, MSI, has only one channel. The term "pixel" refers mainly to a spatial information, i.e. to a specific position in an image, wherein the pixels are arranged in a grid, for example of size N×N. However, the same information is contained if the image information (herein called "feature") available for each pixel is unrolled and stored in, say, a vector with N×N indices. As long as a fixed correspondence is given between the indices of the vector and the position of the pixels in the grid, both formulations are equal. The term "feature" refers, strictly speaking, to the variable storing the information for the pixel. If a medical scanner image, MSI, comprises multiple channels (e.g. red, green, blue, or visible/infrared/ultraviolet) then for each pixel, one feature per channel is given.

It shall be understood that usually the medical scanner image, MSI, will be a two-dimensional medical scanner image, 2DMSI. It is rare that actual 3D medical scanner images are generated. Usually, a number of two-dimensional medical scanner image, 2DMSI, is generated with some distance provided between the planes in which the individual two-dimensional medical scanner images, 2DMSI, are arranged. Thereafter, in order to generate three-dimensional medical scanner images, 3DMSI, the two-dimensional medical scanner images, 2DMSI, are concatenated, taking the distances between the images into account, in order to create three-dimensional medical scanner images, 3DMSI, which may either comprise pixels or which may be converted to comprise voxels.

This means that a two-dimensional borderline can be created using the apparatus and method described herein by applying the method described herein to each of the constituent 2-dimensional medical scanner images, 2DMSI, before they are concatenated from the three-dimensional medical scanner image, 3DMSI. Then, in analogy to the concatenation of the 2-dimensional medical scanner images, 2DMSI, also the generated one-dimensional borderlines may be concatenated (optionally including an interpolation therebetween) in order to generate a 2-dimensional border surface in 3-dimensional space.

Thus, in a display device, a user may be able to view a 3-dimensional rendering of the tissue of interest of a patient together with a 3-dimensional rendering of a 2-dimensional border surface separating the tissue of interest, TOI, from the remainder of the 3-dimensional medical scanner image, 3DMSI. It is evident that this technique may be used in a variety of applications, for example in order to determine 3-dimensional contours of organs, prostheses, anomalies, or the like.

The inventors have found that the present invention is particularly well suited for differentiating a pectoral muscle tissue from the breast tissue in an X-ray mammography image (a so-called "mammogram") and this particular example will feature prominently in the present disclosure. However, it shall be understood that any other form of medical scanner image may be used as well and the any kind of tissue of interest within the medical scanner image may be differentiated from any other kind of tissue therein.

For the present purposes, it shall be understood that the tissue of interest, TOI, is not necessarily the tissue of ultimate interest, for example in further processing such as diagnosing. It will be understood that the tissue that is labelled as "tissue of interest, TOI" in the present disclosure may either be the tissue that is to be diagnosed or, alternatively the tissue that is to be disregarded when diagnosing. Both variants are evidently: interchangeable, as eventually the result is a medical scanner image for which a borderline is provided between two areas. In some cases, even both sides may be "of interest" for example when in the further diagnosing each area is diagnosed using a different artificial neural network, ANN.

The computing device may be realized as any device, or any means, for computing, in particular for executing a software, an App or an algorithm. For example, the computing device may comprise at least one processing unit such as at least one central processing unit, CPU, and/or at least one graphics processing unit, GPU, and/or at least one field-programmable gate array, FPGA, and/or at least one application-specific integrated circuit, ASIC, and/or any combination of the foregoing.

The computing device may further comprise a working memory operatively connected to the at least one processing unit and/or a non-transitory memory operatively connected to the at least one processing unit and/or a working memory. The computing device may be realized as a local device, as a remote device (such as a server connected remotely to a client with a user interface) or as a combination of these. A part, or all, of the computing device may also be implemented by a cloud computing platform. The input module and/or the output module may also be integrated into the computing device.

Although, here, in the foregoing and also in the following, some functions are described as being performed by modules, it shall be understood that this does not necessarily mean that such modules are provided as entities separate from one another. In cases where one or more modules are provided as software, the modules may be implemented by program code sections or program code snippets, which may be distinct from one another but which, may also be interwoven or integrated into one another.

Similarly, in cases where one or more modules are provided as hardware, the functions of one or more modules may be provided by one and the same hardware component, or the functions of several modules may be distributed over several hardware components, which need not necessarily correspond to the modules. Thus, any apparatus, system, method and so on which exhibits all of the features and functions ascribed to a specific module shall be understood to comprise, or implement, said module. In particular, it is a possibility that all modules are implemented by program code executed by the computing device, for example a server or a cloud computing platform.

In systems based on cloud computing technology, a large number of devices is connected to a cloud computing system via the Internet. The devices may be located in a remote facility connected to the cloud computing system. For example, the devices can comprise, or consist of, equipments, sensors, actuators, robots, and/or machinery in an industrial set-up(s). The devices can be medical devices and equipments in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may comprise a plurality of servers or processors (also known as 'cloud infrastructure'), which are geographically distributed and connected to each other via a network. A dedicated platform (hereinafter referred to as 'cloud computing platform') is installed on the servers/processors for providing above functionality as a service (hereinafter referred to as 'cloud service'). The cloud computing platform may comprise a plurality of software programs executed on one or more servers or processors of the cloud computing system to enable delivery of the requested service to the devices and its users.

One or more application programming interfaces (APIs) are deployed in the cloud computing system to deliver various cloud services to the users.

The artificial neural network, ANN, may in particular be a network including a convolutional layer, i.e. a convolutional neural network, CNN. For example, the artificial neural network, ANN, may be a so-called U-net, see for example the publication by Ronneberger et al.

In the present context it is preferred that the artificial neural network, ANN, is a so-called DenseNet, see Huang et al. for details. The pipeline between input and output of a DenseNet comprises at least one so-called "Dense Block". Each Dense Block comprises at least three layers and is characterized in that within a Dense Block the feature maps are not handed over simply from one layer to the next but the input to each layer in a Dense Block is a concatenation of all of the resulting feature maps of the previous layers of the same Dense Block. The layers of the Dense Block may, for example, be a composite function of three consecutive operations: a batch normalization, followed by a rectified linear unit, ReLu, and a 3×3 convolution. As is described in Huang et al., several variations and modifications are possible. For example, a bottleneck layer may be included, dropout functions may be applied during training and so on.

Regarding the functioning of a Dense Block, for example, let I1 be the input to the Dense Block and thus the input I1 to the first layer L1 within the Dense Block, and let O1 be the output of the first layer L1. The input 12 for the second layer L2 is the output O1 of the first layer L1. Based on its input I2=O1, the second layer L2 generates its output O2. Now, in a conventional convolutional neural network, CNN, the output O2 of the second layer L2 would then become the input O3 of the third layer L3.

By contrast, in the Dense Block of a DenseNet, the input I3 of the third layer L3 is a concatenation of the outputs of the preceding layer, i.e. I3=O1& . . . &O2, wherein "&" indicates concatenation. Generally, Ii=O1& . . . &O(i−1). This means that each Dense Block retains information about the evolution of the features within it. A typical Dense Block has 4 or 5 layers, depending, among other factors, on the available processing power and the number of features in I1.

Between two Dense Blocks, usually first a regular convolutional layer and then a pooling layer is arranged. The original input image I0 is usually first put into a first convolutional layer which produces I1 as its output. After the last Dense Block, usually first a pooling layer and then a final linear unit may be provided. Usually, a plurality of Dense Blocks is provided within a DenseNet, for example 3 Dense Blocks.

Image segmentation in the present context shall be understood, for example to mean that for each pixel in a medical scanner image an information is provided which indicates to which classification the pixel belongs. In the present context, the classifications will usually correspond to types of organic tissue. In the simplest form, a first class (or: classification) may correspond to the tissue of interest, for example a pectoral muscle, and a second type of class may correspond to the remainder of the image, i.e. to pixels which do not show part of the pectoral muscle. The pixels in the remainder may for example show other tissue or a background.

In such a simple system with only two classes, segmentation may be achieved by a sample true/false mask in which each pixel is associated with a bit-type feature which is either given a "0" for belonging to a first class or a "1" belonging to a second class. In other words, a segmentation mask may consist of a number of pixels equal to the number of pixels of the input medical scanner image. Each pixel of the mask may uniquely correspond to exactly one pixel of the input medical scanner image. A corresponding value of 0 or 1 in the feature of the segmentation mask may indicate if the corresponding pixel of the input medical scanner image belongs to the first class (tissue of interest, TOI,) or the tissue of interest (remainder of the medical scanner image, MSI).

The output module may be configured to output the output signal to other parts of the system and/or to other devices outside of the system. According to another example embodiment of the present invention, a computer-implemented method for differentiating a tissue of interest from at least one other part of a medical scanner image is provided, the method comprising the steps of:

- providing a medical scanner image, MSI;
- inputting input data based on the provided medical scanner image, MSI, into a trained artificial neural network, ANN;
- generating, by the trained artificial neural network, ANN, output data indicating a one-dimensional borderline between at least a part of the tissue of interest, TOI, and at least one other part of the medical scanner image, MSI, based on the input data; and
- outputting an output signal comprising or based on the generated output data.

The input data may be the medical scanner image, MSI, itself, or may be derived therefrom. Here and in the following, for some (especially longer) terms abbreviations (such as "MSI" for "medical scanner image") are used. Usually, the terms will be given followed by the corresponding abbreviations. In some cases, to improve legibility, only the abbreviation will be used, whereas in other cases only the term itself will be used. The term "at least a part of" may comprise both "a part of" as well as "the entirety of".

One of the main ideas of both the system according to one or more example embodiments and the computer-implemented method according to one or more example embodiments is that, for the purpose of differentiating between a tissue of interest, TOI, and the at least one other part of a (usually two-dimensional) medical scanner image, a one-dimensional borderline is-surprisingly-sufficient. This greatly reduces not only the calculation time of an artificial neural network in the inference phase but also, more importantly, the considerable effort involved in training an artificial neural network.

This approach is particularly advantageous when the medical scanner image, MSI, are standardized such that the borderline separating the tissue of interest, TOI, from the at least one other part of the medical scanner image, MSI, starts and ends at one of the edges of the image, not necessarily at the same edge. In that case, the medical scanner image, MSI, is separated into two section by the borderline, one section consisting of the tissue of interest, TOI, and the other consisting of the remainder of the medical scanner image, MSI.

According to one or more example embodiments of the present invention, a computer-implemented method for training an artificial neural network, ANN, for differentiating a tissue of interest, TOI, from at least one other part of a medical scanner image, MSI, comprising steps of:

- providing a set of medical scanner training images, MSTI;
- providing, for each medical scanner training image, MSTI, label data indicating a labeled one-dimensional borderline between at least a part of the tissue of interest, TOI, from the at least one other part of the medical scanner training image, MSTI;
- providing an artificial neural network, ANN, configured to receive a medical scanner training image, MSTI, as its input and to generate, based thereon, output data indicating a generated one-dimensional borderline between at least a part of the tissue of interest, TOI, and the at least one other part of the medical scanner training image, MSTI; and
- training the artificial neural network, ANN, with supervised learning using a loss function penalizing differences between the output data and the label data.

For the loss function, known algebraic loss functions such as a mean squared error, MSE, function or a sum of squared errors, SSE, loss function may be applied.

The idea of using artificial neural network to directly generate output data indicating a one-dimensional border based on input images which are two-dimensional medical scanner image leads to enormous savings in resources such as electric power and computing time needed for the training of the artificial neural network. Moreover, it leads to a trained artificial neural network with comparatively much less parameters compared to a traditional artificial neural network which receives two-dimensional images as its input and outputs two-dimensional medical images as well. The system or method according to the present invention may therefore be implemented more easily on an edge device.

The training of the artificial neural network may be biased in such a way that the one-dimensional borderline indicated by the output data must begin and end on an edge of the medical scanner image. In this way, it is enforced that the indicated borderline divides the medical scanner image up into two areas, which, added together with the borderline, form the entirety of the medical scanner image, MSI. This in turn makes it easier to generate thereafter a new segmentation mask by simply classifying all pixels on one side of the borderline into a first class and all pixels on the other side of the borderline into a second class. This mask may then be used to indicate which areas should be the basis for an analysis or, respectively, which pixels should be disregarded for a subsequent analysis.

According to one or more example embodiments, the invention provides a computer program product comprising executable program code configured to, when executed, perform the method according to one or more example embodiments of the present invention.

According to one or more example embodiments, the invention provides a non-transient computer-readable data storage medium comprising executable program code configured to, when executed, perform the method according to one or more example embodiments of the present invention.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

According to one or more example embodiments, the invention provides a data stream comprising, or configured to generate, executable program code configured to, when executed, perform the method according to one or more example embodiments of the present invention.

Further advantageous variants, embodiments and refinements are found in the dependent claims as well as in the description with reference to the attached drawings.

In some advantageous embodiments, refinements or variants of embodiments, the output data indicate the one-dimensional borderline in a parametrized way, in particular by at least one of:

- polynomial parameters,
- spline parameters, and/or
- line parameters.

In each case, given a standardized size and orientation of the medical scanner images, as is commonly the case in modern imaging medicine, a few parameters suffice to plot a one-dimensional borderline. This one-dimensional borderline can be overlaid over the medical scanner image and can then be used to distinguish or separate the tissue of interest, TOI, from the at least one other part of a medical scanner image. The number of parameters can be adjusted according to the desired accuracy, to the resolution of the underlying medical scanner images and/or the like. In any case, it is evident that the number of parameters is considerably lower than the number of features for a complete pixel-wise segmentation mask according to the prior art.

As a rule of thumb, it may be approximated that for a medical scanner image of dimensions N×M a pixel-wise segmentation mask according to the prior art would have dimension N×M. By contrast, according to the present invention, at the very most the output data would have the smaller of dimensions N and M (e.g. by noting for each of the N rows in the image at which position, if any, the borderline is present). Thus, in the case of M=N=1000, for example, in the prior art the segmentation mask would have 1000*1000*1 bit=1 Megabit. According to the present invention, at most, the output data indicating the borderline would have 1000*10 bit=10 kilobit. However, using parametrization of the borderline by one of several possible parametrization schemes, this number can be further reduced.

The artificial neural ANN, may be configured such that it comprises, or consists of, a first group of output nodes, of which each output node is configured and trained to output one of the parameters indicating the one-dimensional borderline.

The effect of the reduction in dimension is so significant that the artificial neural network, ANN, may even be configured and trained such as to generate output data for a plurality of parametrization schemes. In other words, the artificial neural network, ANN, may comprise

- a first group of output nodes configured and trained to output parameters of a polynomial parametrization of the one-dimensional borderline; and/or
- a second group of output nodes configured and trained to output parameters of a spline parametrization of the one-dimensional borderline; and/or
- a third group of output nodes configured and trained to output parameters of a line parametrization of the one-dimensional borderline.

Thus, for one particular medical scanner image, MSI, automatically and still with low extremely resource requirements, one, two, three or even more different parametrizations of (one and the same) one-dimensional borderline may be provided simultaneously. An evaluation may be provided which selects one of the provided parametrizations in each case as the optimal one.

Alternatively or additionally, candidate borderlines generated according to each of the parametrizations may be graphically drawn (on a printout or, preferably, on a display device) and may be superimposed on the corresponding medical scanner image, MSI. A user may then, for example, via a graphical user interface implemented by the display device, select one or more of the candidate borderlines as the borderline with which to proceed.

In yet other alternatives, an aggregated borderline may be generated, for example by representing candidate borderlines according to each parametrization on a bitmap and then automatically determining a left-hand-side/right-hand-side (or: inside/outside) outer contour of a superposition of all of the borderline candidates. Depending on the known orientation of the contents of the medical scanner image and a corresponding knowledge on which side the tissue of interest, TOI, is found, one or the other outer contour may be used as a conservative borderline for further processing. The outer contour distal to (or: further removed from) the bulk of the tissue of interest may be employed if it is important that as little as possible of the tissue of interest is on the other side of the final borderline, and the proximal (or: closer) outer contour may be used if it is deemed important that as few as possible portions of the other tissue are on the same side of the borderline as the tissue of interest.

In some advantageous embodiments, refinements, or variants of embodiments, the output data indicate the one-dimensional borderline using a Fast Fourier transformation. This is another efficiently encoded way in which to indicate a one-dimensional borderline in a compressed manner.

In some advantageous embodiments, refinements, or variants of embodiments, the computing device is further configured to implement a mask generating module, MGM, configured to generate a segmentation mask based on the output data. The output module may be configured to output the segmentation mask as part of the output signal or in addition to the output signal. As has been already described in the foregoing, the segmentation mask may be simply based on the fact whether a pixel is arranged on one side of the borderline or on the other side of the borderline. Simply said, all features of the segmentation mask responding to pixels on one side of the borderline may be set to have a value of "0" and all features of the segmentation mask corresponding to pixels on the other side of the borderline (or, alternatively, all other pixels) may be set to a value of "1".

For a further analysis, for example an automated medical image diagnosis by a medical diagnosis assistant system or a medical diagnosis assistance method, the medical scanner image may be provided together with the corresponding segmentation mask to the medical diagnosis assistant system. Alternatively, the medical scanner image may already be modified based on the segmentation mask and the modified medical scanner image may then be provided to a medical diagnosis assistant system.

In some advantageous embodiments, refinements, or variants of embodiments, the computing device further comprises a resizing module configured to reduce the size of the medical scanner image, MSI, in order to obtain a reduced-size medical scanner image, RSMSI. The reduced-size medical scanner image, RSMSI, may be provided to the artificial neural network, ANN, as its input. Thus, the input to the artificial neural network may be the two-dimensional medical scanner image, MSI, itself, a reduced-size medical scanner image, RSMSI, and/or any other type of pre-processed image based on the medical scanner image. Using a reduced-size medical scanner image, RSMSI, further reduces the dimensionality of the problem and thus also the resources required for generating the output data.

When the output data are generated, the borderline according to the output data may then be used together with the original medical scanner image, MSI, since the original medical scanner image, MSI, will be the one which will be used for further processing, for example for medical diagnosis. In some variants, the medical scanner image, MSI, may even be used for further processing with the borderline according to the generated output data overlapped over it, possibly even in a hard-coded variant.

In some advantageous embodiments, refinements, or variants of embodiments, a medical scanner image, MSI, is an X-ray mammography image and/or the tissue of interest, TOI, is a pectoral muscle or at least pectoral muscle tissue. In this case, the tissue of interest, TOI, is usually the tissue that will not be regarded for further medical diagnosis. In other words, the interest into the pectoral muscle as a tissue of interest, TOI, is the interest of removing the pectoral muscle as completely as possible from further considerations in medical diagnosis. It has been found by the inventors that the application of the present invention to distinguishing the pectoral muscle in an X-ray mammography image from the remaining tissue is extremely efficient, in particular as the standard methods and boundary conditions for generating these kinds of images lend themselves well to the application of the ideas as presented herein.

In some advantageous embodiments, refinements, or variants of embodiments, the computing device is configured to implement an orientation-determining module, ODM. The orientation-determining module, ODM, is configured to determine, based on the borderline indicated by the output data, an orientation and/or a position of the tissue of interest, TOI, within the medical scanner image, MSI and/or a parameter of the medical scanner image, MSI. The output signal may comprise data indicating the determined orientation and/or position and/or the parameter.

For example in the previously mentioned specific application to X-ray mammography images and the pectoral muscle as a tissue of interest, TOI, the orientation and/or position of the pectoral muscle within a medical scanner image, MSI, may be determined by the orientation determining module, ODM. This, in turn, may provide information about the axis along which the mammography image was taken which in turn may be important for certain kinds of diagnosis.

It is also an option that the determined orientation and/or position is provided to a user, for example technician, of a medical scanner device essentially in real-time, for example in order to inform the user that the mammography image has to be repeated because the determined orientation and/or position is not within a parameter range considered acceptable. The determined parameter may be, for example, a metric indicating whether or to what degree the image conforms to specifications. The determining of the parameter may at least in part be based on the determined orientation and/or position.

The system according to one or more example embodiments of the present invention may thus also be included within a medical scanner device, or it may be operatively coupled to a medical scanner device in order to facilitate the exchange of data. In particular, the transfer of two-dimensional medical scanner images, 2DMSI, generated by the medical scanner device to the system according to the present invention, and the transfer of the output signal to (at least) the medical scanner device may be facilitated. The system according to one or more example embodiments may also comprise a medical scanner device and may therefore also be designated as a medical scanner system.

In some advantageous embodiments, refinements, or variants of embodiments of any method according to the present invention, the output data indicate one-dimensional borderline by at least one of:

- polynomial parameters,
- spline parameters, and/or
- line parameters.

In some advantageous embodiments, refinements, or variants of embodiments of any method of the present invention, the output data indicate the one-dimensional borderline using a Fast Fourier Transformation.

In some advantageous embodiments, refinements, or variants of embodiments, the method according to an embodiment of the present invention further comprises steps of generating a segmentation mask based on the output data, wherein the output signal comprises the generated segmentation mask.

In some advantageous embodiments, refinements, or variants of embodiments, the providing of the set of medical scanner training images, MSTI, comprises performing a binary erosion on a truth ground segmentation mask, GTSM. In particular, the providing of the set of medical scanner training images, MSTI, may comprise steps of:

- providing, for each medical scanner training image, MSTI, a ground truth segmentation mask, GTSM, indicating the tissue of interest, TOI, or (equivalently) indicating the remainder of the medical scanner training image, MSTI, or at least one other part of the medical scanner training image, MSTI;
- performing binary erosion on the ground truth segmentation mask, GTSM, in order to create an eroded segmentation mask; and
- subtracting the eroded segmentation mask from the ground truth segmentation mask, GTSM, in order to generate the label data.

A ground truth segmentation mask may, for example, classify all pixels of the medical scanner training images, MSTI, into one of two contiguous areas, wherein one area is characterized by pixels having a value of 0 for the remainder, and pixels having a value of 1 for the tissue of interest, TOI (or vice versa). In this way, a borderline separating the two areas within the image is implicitly given.

Applying binary erosion on such a ground truth segmentation mask then results in an essentially similar segmentation mask in which, due to the erosion, the area of pixels with the value 1 has shrunk to some degree along the borderline.

It will be further evident that when the eroded segmentation mask is, pixel-wise, subtracted from the original ground truth segmentation mask, the result will be again a bitmap or pixel map in which now only the pixels along the borderline have a value of 1 and all other pixels have a value of 0. The width of the borderline created in this way is simply determined by the degree of erosion. It has been found by the inventors that a three by three binary erosion kernel yields excellent results. Such a 3×3 binary erosion kernel may consist of a 3×3 grid comprising only "1"s.

However, depending on the resolution of the medical scanner training images, MSTI, and the tissues in question, other sizes of binary erosion kernels such as 5×5, 7×7 or the like may be employed as well. A pixel-wise loss function penalizing differences between such a pixel-wise implementation of label data on the one hand a labeled borderline) and, for example, a parametrized definition of the borderline by the output data generated from the artificial neural network, ANN (a generateated broderline), may for example be calculated as follows: The borderline according to the parametrization may be plotted onto an empty bitmap, marking each pixel of the bitmap that comes into contact with the plotted borderline with a value of 1 and all other pixels with a value of 0. Thus, in the loss function, a pixel-wise comparison between two bitmaps comprising only "0"s and "1"s is possible, for example using a mean squared error, MSE, loss function or a sum of squared errors, SSE, loss function.

Alternatively, the pixel-based borderline ground truth mask generated by the binary erosion and subtraction procedures as described in the foregoing may be used as basis for fitting a parametrization of a one-dimensional borderline to the pixels having a value of "1". The parameters used in the fit may then be, in a loss function, directly compared to corresponding parameters generated by the artificial neural network, ANN.

However, the pixel-wise calculation of the losses is preferred since the interdependency of the parameters of a parametrization such as a polynomial or spline parametrization is comparatively higher than the interdependency of the pixels of the pixel-wise parametrization of the borderline.

As a simple alternative, it is of course also possible that a user, for example a trained physician, provides a one-dimensional borderline ground truth by annotating the medical scanner training images, MSTI, by manually drawing a pixel-wise borderline and/or by manipulating a parametrized borderline on a display such as to fit the actual borderline perceived by the physician between the tissue of interest, TOI, and the at least one other part of the medical scanner training image, MSTI.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

FIG. 1 shows, for better illustration of the present invention, an X-ray mammography medical scanner image, MSI 1, in which black and white have been inverted for a better reproducibility.

The X-ray mammography medical scanner image 1 shows a large first area 2 in which no organic tissue is present, a second area 3 in which breast tissue is present, and a third area in which pectoral muscle tissue is visible which corresponds to a tissue of interest, TOI 4.

In FIG. 1, also an actual borderline 5 between the tissue of interest, TOI 4, and the remainder of the medical scanner image, MSI 1, is shown. The actual borderline 5 has been drawn as a ground truth by a physician and here separates the pectoral muscle tissue of interest, TOI 4, from breast tissue 3 specifically.

Moreover, a candidate borderline candidate 6 has been drawn in FIG. 1 by an automated segmentation system according to the prior art which, as is visible, has been confused by the presence of two differently shaded portions within the breast tissue 3.

FIG. 2, by contrast, shows the same medical scanner image, MSI 1, with the same actual borderline 5 and with a borderline 7 which correctly segments the pectoral muscle tissue of interest, TOI 4, from the breast tissue 3 and which has been generated using the system and method according to the present invention.

It is also visible in FIG. 2 that the borderline 7 extends from one edge of the X-ray medical scanner image, MSI 1, to another edge thereof. For that reason, the borderline 7 splits the medical scanner image, MSI 1, into two distinct portions: one contiguously connected with the upper right corner and essentially coinciding with the pectoral muscle tissue of interest, TOI 4, and another one on the other side of the borderline 7. Thus, the borderline 7 not only differentiates (or: distinguishes, or: separates) the pectoral muscle tissue of interest, TOI 4, from the breast tissue 3 but from the entire remainder 2, 3 of the medical scanner image, MSI 1.

Since the general orientation of body parts for each type of medical scanner image, MSI 1, is usually fixed, information about where the borderline 7 is to be expected or between which edges the borderline 7 is expected to extend may be added as an during the training of an artificial neural network, ANN, as it is described in the foregoing or in the following.

Figures 3, 4:
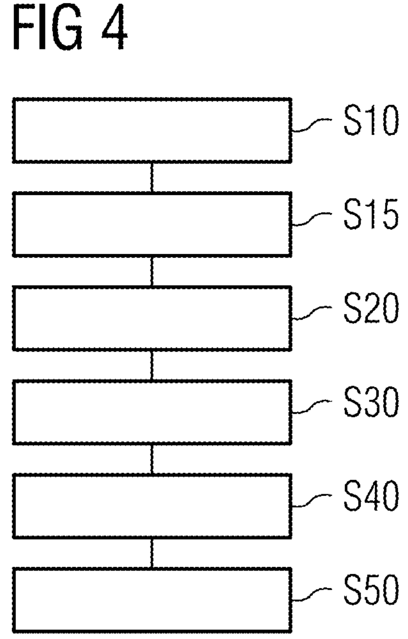

FIG. 3 shows a schematic block diagram illustrating a system 100 according to an embodiment of the present invention, i.e. a system 100 for differentiating a tissue of interest, TOI 4, from at least one other part of a medical scanner image.

The system 100 comprises:

an input module 110 configured to receive a medical scanner image, MSI 1;

a computing device 150 configured to implement an artificial neural network, ANN, trained and configured to generate, based on the medical scanner image, MSI 1, output data indicating a one-dimensional borderline 7 between at least a part of the tissue of interest, TOI 4, from at least one other part 3 within the medical scanner image, MSI 1; and an output module 190 configured to output an output signal 71 comprising or based on the output data.

The artificial neural network, ANN, preferably has a DenseNet architecture, i.e. it comprises at least one Dense Block, more preferably a plurality of Dense Blocks as known, e.g., from Huang et al.

As has been described in the foregoing, the output data may indicate the one-dimensional borderline 7 by at least one of polynomial parameter, spline parameters, line parameters and/or by way of a Fast Fourier Transformation, FFT.

The output signal 71 may comprise, or indicate, or consist of, the output data generated by the artificial neural network, ANN, or may be based thereon and/or may comprise additional data as well. For example, the output signal 71 may comprise instructions for a display device 200 (which may or may not be part of the system 100) to display the one-dimensional borderline 7 together with the medical scanner image, MSI 1.

The computing device 150 may comprise, or be configured to implement, a resizing module 120 configured to reduce the size of the medical scanner image, MSI 1, in order to obtain a reduced-size medical scanner image, RSMSI, and wherein the reduced-size medical scanner image, RSMSI, is provided to the artificial neural network, ANN, as its input (as input data). In this variant, the medical scanner image, MSI 1, is not itself the input for the artificial neural network, ANN, but serves as basis for said input.

The computing device 150 may further be configured to implement an orientation-determining module, ODM 130, configured to determine, based on the borderline 7 indicated by the output data, an orientation and/or a position of the tissue of interest, TOI 4, within the medical scanner image, MSI, or a parameter of the medical scanner image, MSI 1. The output signal may comprise data indicating the determined orientation and/or position.

The computing device 150 may further comprise, or be configured to implement, a mask generating module, MGM 140, configured to generate a segmentation mask based on the output data. The output module 190 can be configured to output the segmentation mask as part of the output signal 71 or in addition to the output signal 71. The mask-generating module, MGM 140, may alternatively receive the output signal 71 from the output module 190, generate the segmentation mask based thereon, and then provide the output module 190 and/or another recipient within or without the system 100 with the generated mask.

The system 100 and the computing device 150 may be modified, adapted or refined according to any of the option, modifications, refinements or variations described in the foregoing.

FIG. 4 shows a schematic flow diagram illustrating a method according to an embodiment of the present invention, i.e. a computer-implemented method for differentiating a tissue of interest, TOI 4, from at least one other part of a medical scanner image, MSI 1. The method according to FIG. may in particular be performed using the system 100 of FIG. 3 and may be adapted or modified in any way that has been described for the system according to the present invention, and vice versa.

In a step S10, a medical scanner image, MSI 1 is provided. The MSI 1 may be provided over a wirebound or wireless interface, for example from the medical scanner device itself or from a Picture Archiving and Communications System, PACS. The MSI 1 may also be downloaded from a cloud storage or uploaded into a cloud computing platform implementing a computing device 150 as has been described in the foregoing.

In a step S20, input data based on the provided medical scanner image, MSI 1, are input into a trained artificial neural network, ANN. input The data may consist of the provided medical scanner image, MSI 1, or may be derived therefrom. For example, instead of the MSI 1 itself, a re-sized medical scanner image, RSMCI, may be used as the input data for the ANN. Thus, the method may comprise a step S15 of changing (or: re-sizing), in particular reducing, the size of the medical scanner image, MSI 1, in order to obtain the reduced-size medical scanner image, RSMSI.

In a step S30, output data indicating a one-dimensional borderline 7 between at least part of the tissue of interest, TOI 4, from the at least one other part of the medical scanner image, MSI 1, are generated by the trained artificial neural network, ANN, based on the input data. As has been described in the foregoing, the output data may be generated such as to indicate the one-dimensional borderline 7 by at least one of polynomial parameter, spline parameters, line parameters and/or by way of a Fast Fourier Transformation, FFT.

Again, a preferred application is the differentiating (or: distinguishing) or pectoral muscle tissue from breast tissue in an X-ray mammography image.

In a step S40, an output signal 71 is generated which comprises, or consists of, or is based on, the generated output data.

In an optional post-processing step S50, a segmentation mask is generated based on the generated output data, for example as has been described in the foregoing, in particular with respect to the mask generation module, MGM 140. When, for example, the borderline 7 for an MSI 1 of dimensions M×N is expressed by one of the M x-values for each of the N y-values, and when the x-values generated as part of the borderline 7 are denoted as Pi for each y-value denoted with i, then the segmentation mask Mfinal may be generated by:

creating a blank image of size (M×N) and $$MFinal(x > P_i, i) = 1 \forall i \in [0, N]$$

The ">" (larger sign) here stems from the fact that in the example used herein, the pectoral muscle tissue of interest, TOI 4, is located on the right-hand edge (edge of highest x-values) of the medical scanner images, MSIs 1. This means that, when the x-values Pi of the borderline 7 are known, in each line (y-values of i) every pixel with an x-value larger than Pi is given the feature value "1" indicating belonging to the tissue of interest, TOI 4.

Figure 5:
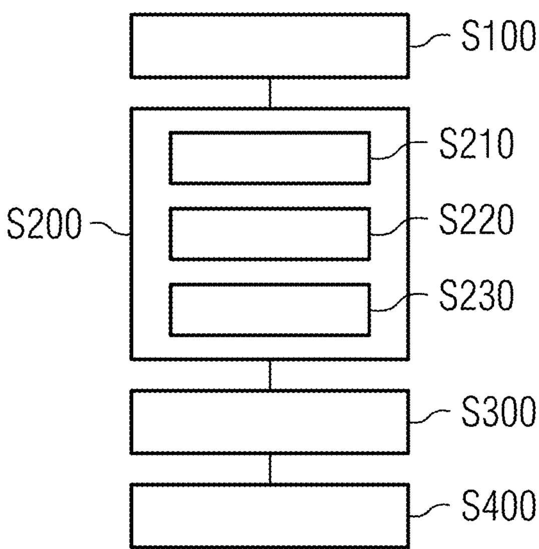

FIG. 5 shows a schematic flow diagram illustrating a method according to an embodiment of the present invention, i.e. a computer-implemented method for training an artificial neural network, ANN, for differentiating a tissue of interest 4 from at least one other part of a medical scanner image, MSI 1. The method according to FIG. 5 may in particular be used for training the ANN used in the system 100 of FIG. 3 or in the method of FIG. 4 and may be adapted or modified in any way that has been described for the system according to one or more example embodiments or the method according to one or more example embodiments.

In a step S100, a set of medical scanner training images, MSTI, is provided. The MSTIs should ideally have the same format and content as the medical scanner images, MSI 1, that the trained artificial neural network, ANN, is intended to receive in a later inference (or: deployment) stage.

In a step S200, for each medical scanner training image, MSTI, data label indicating a one-dimensional borderline 7 (a labeled borderline) between at least a part of the tissue of interest, TOI 4, from at least one other part of the medical scanner training image, MSTI, are provided.

The providing S200 of the label data for the set of medical scanner training images, MSTI, may for example be performed as follows:

In a sub-step S210, for each medical scanner training image, MSTI, a ground truth segmentation mask, GTSM, is provided which indicates the tissue of interest, TOI 4 or, alternatively, indicates the remainder (or at least one other part) of the medical scanner training image, MSTI.

In a sub-step S220, binary erosion is performed on (or: applied to) the ground truth segmentation mask, GTSM, in order to create an eroded segmentation mask.

In a sub-step S230, the eroded segmentation mask is r: subtracted in a pixel-wise manner from the ground truth segmentation mask, GTSM, (or vice versa, depending on which part is marked with "1" and which with "0") in order to generate the label data. The result is a kind of segmentation mask in which only the points or pixels that have been "eroded", i.e. the outmost points of the ground truth segmentation mask, GTSM, have the value of "1", whereas all other pixels have the value of "0". In other words, the borderline 7 is now marked by pixels (or, more correctly, the features associated with the pixels) having the value of "1".

The label data may thus be presented in the form of a borderline 7. As an example, the borderline 7 is defined as a set of continuous, connected points that lie on the boundary separating the tissue of interest, TOI 4, from the remainder of the medical scanner image, MSI 1, for example on the boundary separating pectoral muscle tissue from breast tissue in an X-ray mammography image.

The borderline 7 as label data may be represented, for a medical scanner image, MSI 1, given as a 2-dimensional image with M rows and N columns, as an ordered vector B of x-coordinates for each y-coordinate in the eroded segmentation mask as:

$$B = \{x_i \in [0, M] | BM(x_i, i) = 1\} \forall i \in [0, N],$$

wherein BM denotes the result of sub-step S230, i.e. a mask in which only the points (or: pixels) on the borderline 7 have a feature value of "1" and all other points have a feature value of "0".

As has been described in the foregoing, also other methods for providing, specifically producing, the labels are known, for example manual annotation of the medical scanner training images, MSTI, by a physician.

In a step S300, an artificial neural network, ANN, is provided which is configured to receive a medical scanner training image, MSTI, as its input data and to generate, based thereon, output data indicating a one-dimensional borderline 7 between at least a part of the tissue of interest, TOI 4, from at least one other part of the medical scanner training image, MSTI, preferably between the entire tissue of interest, TOI 4, and the remainder of the medical scanner training image, MSTI, or at least one other type of tissue. Again, a preferred application is the differentiating (or: distinguishing) of pectoral muscle tissue breast from tissue in an X-ray mammography image.

In a step S400, the artificial neural network, ANN, with is trained with supervised learning using a loss function penalizing differences between the output data (e. g., a generated borderline) and the label data (e.g., a labeled borderline). For the loss function, algebraic loss functions such as MSE or SSE are preferred. When—as above—the x-values of the borderline 7 (as generated by the ANN) are denoted as Pi and the corresponding x-values of the labels are denoted as Ti, in each case for all of the y-values i, then an SSE loss function may be given by:

$$SSE_{loss} = \sum_{i=0}^{N} \sqrt{T_i^2 - P_i^2}$$

Of course, other types of loss functions, in particular algebraic loss functions, may be employed as well.

Figure 6:
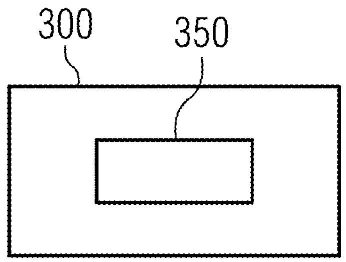

FIG. 6 shows a schematic block diagram illustrating a computer program product 300 according to an embodiment of the present invention. The computer program product 300 comprises executable program code 350 configured to, when executed, perform the method according to an embodiment of the present invention, in particular as has been described with respect to the preceding figures.

Figure 7:
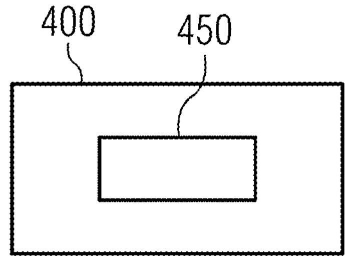

FIG. 7 shows a schematic block diagram illustrating a non-transitory computer-readable data storage medium 400 according to an embodiment of the present invention. The data storage medium 400 comprises executable program code 450 configured to, when executed, perform the method according to any embodiment of the present invention, in particular as has been described with respect to the preceding figures.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other skilled in the art examples will be apparent to one upon reviewing the above specification.

The embodiments were chosen and described in order to best explain practical applications, to thereby enable others skilled in the art to best utilize the invention and various embodiments with various modifications as are suited to the particular use contemplated.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A system for differentiating a tissue of interest from at least one other part of a medical scanner image, the system comprising:

a first device, the first device including, at least one first memory configured to store first instructions, and at least one first processor configured to execute the first instructions and cause the first device to perform at least, generate an eroded segmentation mask for each medical scanner training image of a set of medical scanner training images based on a binary erosion of a ground truth segmentation mask of each medical scanner training image, the ground truth segmentation mask indicating a tissue of interest within the respective medical scanner training image, generate label data based on a difference between the eroded mentation mas and the ground truth ion mask of each medical scanner training image; and train an artificial neural network on the label data, the trained artificial neural network being configured to generate output data based on a reduced-size medical scanner image, the output data indicating a one-dimensional borderline between at last a part of the tissue of interest and at least one other within the medical scanner image by at least one of polynomial parameters, spline parameters, or line parameters;

an input module configured to receive a medical scanner image;

a computing device configured to, implement a resizing module, the resizing module being configured to reduce a size of the medical scanner image to obtain a reduced-size medical scanner image, implement the trained artificial neural network, provide the trained artificial neural network with the reduced-size medical scanner image, generate a segmentation mask based on the output data; and an output module configured to output an output signal comprising or based on the output data, wherein the output signal comprises the generated segmentation mask.

2. The system of claim 1, wherein the medical scanner image is an X-ray mammography image and the tissue of interest is pectoral muscle tissue.

3. The system of claim 1, wherein the computing device is further configured to implement an orientation determining module, the orientation determining module is configured to determine, based on the one-dimensional borderline indicated by the output data, at least one of an orientation of the tissue of interest within the medical scanner image, a position of the tissue of interest within the medical scanner image, or a parameter of the medical scanner image, and the output signal comprises data indicating at least one of the determined orientation, position or parameter.

4. The system of claim 1, wherein the computing device is an edge device.

5. A computer-implemented method for differentiating a tissue of interest from at least one other part of a medical scanner image, the method comprising:

generating an eroded segmentation mask for each medical scanner training image of a set of medical scanner training images based on a binary erosion of a ground truth segmentation mask of each medical scanner training image, the ground truth segmentation mask indicating a tissue of interest within the respective medical scanner training image;

generating label data based on a difference between the eroded segmentation mask and the ground truth segmentation mask of each medical scanner training image of the set of medical scanner training images;

training a trained artificial neural network, the trained artificial neural network being trained on the label data, the trained artificial neural network being configured to generate output data based on a reduced-size medical scanner image, the output data indicating a one-dimensional borderline between at last a part of the tissue of interest and at least one other part within the medical scanner image by at least one of polynomial parameters, spline parameters, or line parameters;

providing a medical scanner image;

reducing a size of the medical scanner image to obtain a reduced-size medical scanner image;

inputting input data into the trained artificial neural network, the input data being based on the reduced-size medical scanner image;

generating, by the trained artificial neural network, output data based on the input data, generating a segmentation mask based on the output data; and outputting an output signal comprising or based on the generated output data, wherein the output signal comprises the generated segmentation mask.

6. A non-transient computer-readable data storage medium comprising executable program code configured to, when executed by a system, cause the system to perform the method of claim 5.

* * * * *